United States Patent Office 3,655,691
Patented Apr. 11, 1972

3,655,691
N,N'-DISUBSTITUTED CYCLOPENTANE-1,2,3,4-TETRACARBOXIMIDES
Donald F. Page, East Greenbush, N.Y., assignor to Sterling Drug Inc., New York, N.Y.
No Drawing. Original application Nov. 15, 1967, Ser. No. 683,109, now Patent No. 3,551,447, dated Dec. 29, 1970. Divided and this application Mar. 30, 1970, Ser. No. 24,033
Int. Cl. C07d 27/30
U.S. Cl. 260—326.3
2 Claims

ABSTRACT OF THE DISCLOSURE

Perhydrocyclopenta[1,2-c:3,4-c']dipyrroles and N,N'-disubstituted derivatives thereof are prepared by reacting cyclopentane-1,2,3,4-tetracarboxylic acid anhydride with a primary amine and reducing the resulting cyclopentane-1,2,3,4-tetracarboximide or N,N'-disubstituted derivative thereof with lithium aluminum hydride. The compounds are insecticides, and also affect the central nervous and cardiovascular system of mammalian species.

N,N'-DISUBSTITUTED CYCLOPENTANE-1,2,3,4-TETRACARBOXIMIDES

This application is a division of my copending application Ser. No. 683,109, filed Nov. 15, 1967, now U.S. Pat. 3,551,447.

This invention relates to the novel perhydrocyclopenta[1,2-c:3,4-c']dipyrrole, to N,N'-disubstituted derivatives thereof, and to intermediates in the preparation of the foregoing.

A product aspect of the invention resides in compounds of the formula

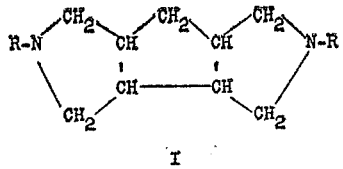

I wherein R is hydrogen, lower-alkyl, phenyl-lower-alkyl, B=N—lower-alkyl, lower-alkanoyl, halo-lower-alkanoyl, dihalo-lower-alkanoyl, trihalo-lower-alkanoyl or B=N—lower-alkanoyl; wherein B=N is di-lower-alkylamino, polymethylenimino or morpholino.

In the foregoing definitions, "lower-alkyl" stands for alkyl having from one to about six carbon atoms, and thus includes such groups as methyl, ethyl, propyl, isopropyl, butyl, pentyl, hexyl, and the like; "lower-alkanoyl" stands for alkanoyl having from one to about six carbon atoms, and thus includes such groups as formyl, acetyl, propionyl, butyryl, isobutyryl, valeryl, caproyl, and the like; halo stands for any of the four halogens, fluorine, chlorine, bromine or iodine, preferably chlorine or bromine; and polymethylenimino stands for azacycloalkane radicals having from 5 to 7 ring members, thus including 1-pyrrolidinyl, piperidino and hexamethylenimino.

The compounds of Formula I wherein R is hydrogen, lower-alkyl, phenyl-lower-alkyl or B=N—lower-alkyl can be prepared as follows:

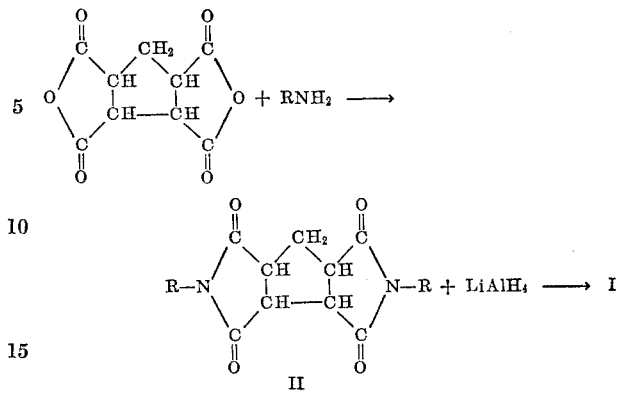

The first step comprises reacting the known cyclopentane-1,2,3,4-tetracarboxylic acid dianhydride with the appropriate amine, RNH₂, where R is lower-alkyl, phenyl-lower-alkyl or B=N—lower-alkyl, to give a diimide of Formula II. The reactants are heated together, optionally in the presence of an inert solvent, at a temperature between about 50° and 150° C. In the event that the compound where R is hydrogen is desired, the anhydride is preferably heated with urea (R=H₂NCO). The resulting compound of Formula II where R is H₂NCO is not isolated but is hydrolyzed during the work-up procedure to give the compound of Formula II where R is hydrogen.

The second step comprises reducing the diimide II with lithium aluminum hydride to give a compound of Formula I wherein R is hydrogen, lower-alkyl, phenyl-lower-alkyl or B=N—lower-alkyl.

The compound of Formula I wherein R is hydrogen is alternatively prepared by hydrogenolysis of the compound of Formula I wherein R is benzyl.

The compounds of Formula I wherein R is acyl, that is, lower-alkanoyl, halo-lower-alkanoyl, dihalo-lower-alkanoyl, or trihalo-lower-alkanoyl, are prepared by acylation of the compound of Formula I wherein R is hydrogen. The acylation is carried out by reacting the latter with the appropriate acid halide or anhydride in an inert solvent, preferably in the presence of an amine catalyst such as triethylamine.

The compounds of Formula I where R is B=N—lower-alkanoyl are prepared by reacting a compound of Formula I wherein R is halo-lower-alkanoyl with a secondary amine, B=NH.

A further product aspect of the invention resides in compounds of Formula II wherein R is di-lower-alkylamino-lower-alkyl, polymethylenimino or morpholino.

The compounds of Formulas I and II can be prepared from any of the various stereoisomers of cyclopentane-tetracarboxylic acid dianhydride, and thus can have any of the possible stereoisomeric configurations about the bridge-head carbons. A preferred starting material is the readily available cis,cis,cis,cis-cyclopentanetetracarboxylic acid dianhydride which leads to compounds of Formulas I and II having the cis,cis,cis,cis-configuration.

The compounds of Formula I wherein R is hydrogen, lower-alkyl, phenyl-lower-alkyl, B=N—lower-alkyl or B=N—lower-alkanoyl; and the compounds of Formula II wherein R is B=N—lower-alkyl, are basic in nature and readily form acid-addition or quaternary ammonium salts. Such basic compounds have two basic nitrogens, and in the case of compounds of Formula I where R is B=N—lower-alkyl there are four basic nitrogens. Thus, mono, di, tri or tetra acid-addition or quaternary ammonium salts can be produced depending upon the basic compound used and the quantity of acid or quaternizing agent employed.

The acid-addition and quaternary ammonium salts of the basic compounds of Formulas I and II are within the purview of the invention and are the full equivalents of the free bases claimed herein.

It will thus be appreciated that each of Formulas I and II not only represents the structural configuration of the bases of Formulas I and II but each is also representative of the respective structural entity which is common to all of the respective compounds of Formulas I and II, whether in the form of the free bases or in the form of the acid-addition or quaternary ammonium salts of the bases. By virtue of this common structural entity, the bases and their salts have inherent biological activity of a type to be more fully described hereinbelow. When used for pharmaceutical purposes one can employ the free bases themselves or the acid-addition or quaternary ammonium salts formed from pharmaceutically-acceptable acids or esters, that is, acids or esters whose anions are innocuous to the animal organism in effective doses of the salts so that beneficial properties inherent in the common structural entity represented by the free bases are not vitiated by side-effects ascribable to the anions.

In utilizing the pharmacodynamic activity of the salts of the invention, pharmaceutically-acceptable salts are preferred. Although water-insolubility, high toxicity, or lack of crystalline character may make some particular salt species unsuitable or less desirable for use as such in a given pharmaceutical application, the water-insoluble or toxic salts can be converted to any desired pharmaceutically-acceptable salt by double decomposition reactions involving the anion, for example, by ion-exchange procedures. Moreover, apart from their usefulness in pharmaceutical applications, the salts are useful as characterizing or identifying derivatives of the free bases or in isolation or purification procedures.

It will be appreciated from the foregoing that all of the acid-addition and quaternary ammonium salts of the new bases of the invention are useful and valuable compounds, regardless of considerations of solubility, toxicity, physical form, and the like, and are accordingly within the purview of the instant invention.

The novel feature of the compounds of the invention, then, resides in the concept of the bases and cationic forms of the basic compounds of Formulas I and II and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids. Illustrative acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the basic compounds of Formulas I and II are obtained by the addition of esters of strong acids to the free base form of the compounds, said esters having a molecular weight less than about 300. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, 2,3,4,5,6-pentachlorobenzyl chloride, 4-nitrobenzyl chloride, 4-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

The compounds of the invention can be used as insecticidal agents, and when so used can be applied either in the dry state or as a solution in an aqueous or organic solvent.

Pharmacological evaluation has shown that compounds of the invention also affect the cardiovascular and central nervous system. For example, standard tests on the compounds have shown alteration in the heart contractile force in the isolated rabbit heart, psychomotor depressant activity when administered orally to mice and potentiation of barbiturate anesthesia when administered to mice. The actual determination of the numerical biological data definitive for a particular compound is readily determined standard test procedures by technicians having ordinary skill in pharmacological test procedures, without any need for any extensive experimentation. The compounds of the invention are effective in amounts of 1 to 500 mg. per dosage unit depending upon the compound used, the manner of administration and the condition to be treated. They are prepared for use by conventional pharmaceutical formulation procedures; that is, in capsule or tablet form with conventional excipients (for example, calcium carbonate, starch, lactose, talc, magnesium stearate, gum acacia, and the like) for oral administration; or as an aqueous or oil suspension in a pharmaceutically acceptable vehicle (aqueous alcohol, glycol, oil solution or oil-water emulsion) for parenteral administration.

The compounds of Formula II are also useful as intermediates in the preparation of compounds of Formula I.

The structures of the compounds of the invention were established by the modes of synthesis, by elementary analysis, and by ultraviolet and infrared spectral determinations.

The following examples will further illustrate the invention without the latter being limited thereby.

EXAMPLE I

Cyclopentane-1,2,3,4-tetracarboximide [II; R=H]

A mixture of 10.5 g. of cis,cis,cis,cis - cyclopentane-1,2,3,4-tetracarboxylic acid dianhydride and 6.6 g. of urea was heated slowly to 150° C. over a period of 135 minutes and held at 150° C. for three hours with occasional stirring. The reaction mixture was cooled, 40 ml. of water added, and the mixture heated to 100° C. with stirring and filtered hot. The filtrate was chilled and the solid collected and recrystallized from water to give cyclopentane-1,2,3,4-tetracarboximide, colorless plates, M.P. 305–310° C. (dec.).

Cyclopentane-1,2,3,4-tetracarboximide was found to be active as a psychomotor depressant (72% decrease in spontaneous activity as measured in a photocell activity cage) when administered to mice at a dose level of 300 mg./kg. orally.

EXAMPLE 2

N,N'-bis(2-diethylaminoethyl)-cyclopentane-1,2,3,4-tetracarboximide [II; R is $(C_2H_5)_2NCH_2CH_2$]

To a solution of 21.00 g. of cis,cis,cis,cis-cyclopentane-1,2,3,4-tetracarboxylic acid dianhydride in 200 ml. of dimethylformamide was added 25.55 g. of 2-diethylaminoethylamine, and the mixture was stirred at about 110° C. for 45 minutes. Toluene (330 ml.) was then added, and the mixture was stirred at reflux under a water separator for eight and one-half hours. The mixture was filtered and the filtrate concentrated in vacuo. The residue was stirred with 600 ml. of ethyl acetate, the solid product collected and the filtrate concentrated to 150 ml. and diluted with petroleum ether to afford additional solid. A total of 30.6 g. of product was obtained which was recrystallized from an ethyl acetate-petroleum ether mixture to give N,N' - bis(2 - diethylaminoethyl)cyclopentane-1,2,3,4-tetracarboximide, pale yellow plates, M.P. 99–101° C.

N,N'-bis(2 - diethylaminoethyl)cyclopentane - 1,2,3,4-tetracarboximide was found to be active in stimulating the contractile force of the isolated rabbit heart when applied at a dose level of 0.8 mg. per heart.

By replacing the 2-diethylaminoethylamine in the foregoing preparation by a molar equivalent amount of 4-dibutylaminobutylamine,
2-(1-pyrrolidinyl)ethylamine,
2-(piperidino)ethylamine,
2-(hexamethylenimino)ethylamine, or
2-(morpholino)ethylamine, there can be obtained, respectively, N,N'-bis(4-dibutylaminobutyl)cyclopentane-1,2,3,4-tetracarboximide [II; R is $(C_4H_9)_2NCH_2CH_2CH_2CH_2$],
N,N'-bis[2-(1-pyrrolidinyl)ethyl]cyclopentane-1,2,3,4-tetracarboximide [II; R is $C_4H_8NCH_2CH_2$];
N,N'-bis[2-(piperidino)ethyl]cyclopentane-1,2,3,4-tetracarboximide [II; R is $C_5H_{10}NCH_2CH_2$];
N,N'-bis[2-(hexamethylenimino)ethyl]cyclopentane-1,2,3,4-tetracarboximide [II; R is $C_6H_{12}NCH_2CH_2$]; or
N,N'-bis[2-(morpholino)ethyl]cyclopentane-1,2,3,4-tetracarboximide [II; R is $OC_4H_8NCH_2CH_2$].

EXAMPLE 3

N,N'-dibenzylcyclopentane - 1,2,3,4 - tetracarboximide [II; R is $C_6H_5CH_2$] was prepared from 21.00 g. of cis,cis,cis,cis-cyclopentane-1,2,3,4-tetracarboxylic acid dianhydride and 24.3 ml. of benzylamine according to the procedure of Example 2. The crude product was fractionally crystallized from ethyl acetate to give 12.64 g. of N,N'-dibenzylcyclopentane - 1,2,3,4 - tetracarboximide, colorless prisms, M.P. 156–158° C., when recrystallized first from ethyl acetate and then from ethanol.

By replacing the benzylamine in the foregoing preparation by a molar equivalent amount of methylamine and warming the reaction mixture in a closed vessel or autoclave there can be obtained N,N'-dimethylcyclopentane-1,2,3,4-tetracarboximide [II; R is $CH_3$].

By replacing the benzylamine in the foregoing preparation by a molar equivalent amount of n-hexylamine there can be obtained N,N'-dihexylcyclopentane-1,2,3,4-tetracarboximide [II; R is $C_6H_{13}$].

EXAMPLE 4

N,N'-bis(3 - dimethylaminopropyl)cyclopentane-1,2,3,4-tetracarboximide [II; R is $(CH_3)_2NCH_2CH_2CH_2$] was prepared from 10.5 g. of cis,cis,cis,cis-cyclopentane-1,2,3,4-tetracarboxylic acid dianhydride and 15.6 ml. of 3-dimethylaminopropylamine according to the procedure of Example 2. The crude product was dissolved in benzene and chromatographed on 1000 g. of silica gel. The column was eluted with a benzene-ethyl acetate-acetone-methanol solvent sequence. The desired product was eluted with 25–50% methanol in acetone and treated with an excess of ethanolic hydrogen chloride. There was thus obtained N,N'-bis(3 - dimethylaminopropyl)cyclopentane-1,2,3,4-tetracarboximide in the form of its dihydrochloride salt, M.P. 211–220° C. when recrystallized from isopropyl alcohol.

EXAMPLE 5

N,N'-bis(2-diethylaminoethyl)perhydrocyclopenta[1,2-c:3,4-c']dipyrrole [I; R is $(C_2H_5)_2NCH_2CH_2$]

A solution of 10.15 g. of N,N'-bis(2-diethylaminoethyl)cyclopentane - 1,2,3,4 - tetracarboximide (Example 2) in 100 ml. of tetrahydrofuran was added during 15 minutes to a stirred suspension of 4.75 g. of lithium aluminum hydride in 500 ml. of tetrahydrofuran. The mixture was stirred under reflux for 16 hours, then partly cooled, and 100 ml. of methylene dichloride and 9.5 ml. of water in two volumes of tetrahydrofuran were added while keeping the mixture in a nitrogen atmosphere. The mixture was filtered, the cake slurried with methylene dichloride and the filtrates concentrated in vacuo. The residue was distilled to give 6.45 g. of pale yellow oil (B.P. 68–123° C./0.005 mm.). The resulting base was dissolved in isopropyl alcohol and treated with two equivalents of hydrogen chloride in ethanol. The solution was concentrated to 75–100 ml. and diluted with ether. The solid product which separated was collected and recrystallized from isopropyl alcohol-ether to give N,N'-bis(2 - diethylaminoethyl)perhydrocyclopenta-[1,2-c:3,4-c']dipyrrole in the form of its dihydrochloride salt, M.P. 145–146° C. (dec.).

By replacing the N,N'-bis(2 - diethylaminoethyl)cyclopentane - 1,2,3,4 - tetracarboximide by a molar equivalent amount of N,N'-bis(4-dibutylaminobutyl)cyclopentane-1,2,3,4-tetracarboximide,
N,N'-bis[2-(1-pyrrolidinyl)ethyl]cyclopentane-1,2,3,4-tetracarboximide,
N,N'-bis[2-(piperidino)ethyl]cyclopentane-1,2,3,4-tetracarboximide,
N,N'-bis[2-(hexamethylenimino)ethyl]cyclopentane-1,2,3,4-tetracarboximide, or
N,N'-bis[2-(morpholino)ethyl]cyclopentane-1,2,3,4-tetracarboximide, there can be obtained, respectively, N,N'-bis(4-dibutylaminobutyl)perhydrocyclopenta[1,2-c:3,4-c']dipyrrole [I; R is $(C_4H_9)_2NCH_2CH_2CH_2CH_2$];
N,N'-bis[2-(1-pyrrolidinyl)ethyl]perhydrocyclopenta-[1,2-c:3,4-c']dipyrrole [I; R is $C_4H_8NCH_2CH_2$];
N,N'-bis[2-(piperidino)ethyl]perhydrocyclopenta[1,2-c:3,4-c']dipyrrole [I; R is $C_5H_{10}NCH_2CH_2$];
N,N'-bis[2-(hexamethylenimino)ethyl]perhydrocyclopenta[1,2-c:3,4-c']dipyrrole [I; R is $C_6H_{12}NCH_2CH_2$]; or
N,N'-bis[2-(morpholino)ethyl]perhydrocyclopenta[1,2-c:3,4-c']dipyrrole [I; R is $OC_4H_8NCH_2CH_2$].

EXAMPLE 6

N,N'-bis(3 - dimethylaminopropyl)perhydrocyclopenta-[1,2-c:3,4-c']dipyrrole [I; R is $(CH_3)_2NCH_2CH_2CH_2$] was prepared by lithium aluminum hydride reduction of N,N'-bis(3 - dimethylaminopropyl)cyclopentane-1,2,3,4-tetracarboximide (Example 4) according to the procedure of Example 5, and was obtained in the form of its tetrahydrochloride salt, M.P. 275–>290° C.

Similarly, N,N'-dihexylcyclopentane - 1,2,3,4 - tetracarboximide can be reduced to N,N'-dihexylperhydrocyclopenta[1,2-c:3,4-c]dipyrrole [I; R is $C_6H_{13}$].

EXAMPLE 7

N,N'-dibenzylperhydrocyclopenta[1,2-c:3,4-c']dipyrrole [I; R is $C_6H_5CH_2$]

A solution of 23.30 g. of N,N'-dibenzylcyclopentane-1,2,3,4 - tetracarboximide (Example 3) in 300 ml. of tetrahydrofuran was added to a stirred suspension of 17.06 g. of lithium aluminum hydride and 10.00 g. of aluminum chloride in 500 ml. of tetrahydrofuran. The mixture was stirred under reflux for 16 hours, then cooled and the excess hydride decomposed with water. The mixture was filtered, the cake slurried with methylene dichloride, the filtrates concentrated in vacuo and the residue distilled. The fraction boiling at 120–150° C. (0.02 mm.) was collected, giving 11.85 g. of pale yellow oil, constituting the product in the free base form. The latter was dissolved in 400 ml. of isopropyl alcohol and treated with 14.93 g. of p-toluenesulfonic acid, then concentrated to 125 ml. and diluted with ether. The product was collected and dried to give 20.66 g. of N,N'-dibenzylperhydrocyclopenta[1,2-c:3,4-c']dipyrrole in the form of its bis(p-toluenesulfonate) salt, colorless prisms, M.P. 187–189° C.

N,N' - dibenzylperhydrocyclopenta[1,2 - c:3,4-c']dipyrrole was found to potentiate hexobarbital when administered intraperitoneally to mice at a dose level of 50 mg./kg. as measured by loss of righting reflex [method of Wylie, Proc. Soc. Exptl. Biol. Med. 98, 716 (1958)].

N,N' - dibenzylperhydrocyclopenta[1,2 - c:3,4 - c']dipyrrole bis(p-toluenesulfonate) (13.74 g.) in 200 ml. of water was made strongly alkaline with 35% sodium hydroxide. The mixture was extracted with chloroform, the chloroform solutions filtered, dried over anhydrous calcium sulfate, and concentrated in vacuo. The residue comprising the free base was dissolved in 100 ml. of acetonitrile and treated with 9.31 g. of methyl p-toluenesulfonate. The mixture was stirred at reflux for 21 hours, cooled, and the product which separated was collected and recrystallized from an isopropyl alcohol-ether mixture to give 8.14 g. of the bis(methyl p-toluenesulfonate) quaternary ammonium salt of N,N'-dibenzylperhydrocyclopenta[1,2-c:3,4-c']dipyrrole, M.P. 248–251° C.

EXAMPLE 8

N,N'-dimethylperhydrocyclopenta[1,2-c:3,4-c'] dipyrrole [I; R is $CH_3$]

A solution of 7.87 g. of the bis(methyl p-toluenesulfonate) quaternary ammonium salt of N,N'-dibenzylperhydrocyclopenta[1,2-c:3,4-c']dipyrrole in 200 ml. of ethanol was hydrogenated in the presence of 0.75 g. of palladium-on-carbon catalyst for 75 minutes at room temperature. The reaction mixture was filtered, concentrated in vacuo, and the residue crystallized from an isopropyl alcohol-ether mixture to give 5.33 g. of N,N'-dimethylperhydrocyclopenta[1,2-c:3,4-c']dipyrrole in the form of its bis(p-toluenesulfonate) salt, colorless prisms, M.P. 188–191° C.

N,N' - dimethylperhydrocyclopenta[1,2-c:3,4-c']dipyrrole can also be prepared by lithium aluminum hydride reduction of N,N'-dimethylcyclopentane-1,2,3,4-tetracarboximide.

EXAMPLE 9

Perhydrocyclopenta[1,2-c:3,4-c']dipyrrole [I; R is H]

A solution of 6.87 g. of N,N'-dibenzylperhydrocyclopenta[1,2-c:3,4-c']dipyrrole bis(p-toluenesulfonate) (Example 7) was hydrogenated in the presence of 0.50 g. of palladium-on-carbon catalyst at 600–660 p.s.i. and 20–61° C. After the prerequisite amount of hydrogen had been taken up, the mixture was filtered, the filtrate concentrated in vacuo, and the residue recrystallized from an isopropyl alcohol-ether mixture to give 4.64 g. of perhydrocyclopenta[1,2-c:3,4-c']dipyrrole in the form of its bis-p-toluenesulfonate) salt, pale yellow prisms, M.P. 186–187.5° C.

Perhydrocyclopenta[1,2-c:3,4-c']dipyrrole can also be prepared by lithium aluminum hydride reduction of cyclopentane-1,2,3,4-tetracarboximide.

EXAMPLE 10

N,N'-bis(dichloroacetyl)perhydrocyclopenta-[1,2-c:3,4-c']dipyrrole [I; R is $Cl_2CHCO$]

A solution of 4.97 g. of perhydrocyclopenta[1,2-c:3,4-c']dipyrrole in the form of its bis(p-toluenesulfonate) salt and 5.62 ml. of triethylamine in 100 ml. of chloroform was cooled in an ice bath, and 3.85 ml. of dichloroacetyl chloride in a few ml. of chloroform was added over a period of three hours. The mixture was stirred for 30 minutes, allowed to stand overnight and then heated at reflux for eight hours. The reaction mixture was then treated with 5 ml. of methanol, stirred for ten minutes and concentrated in vacuo. The residue was dissolved in benzene, washed with water, dried over anhydrous magnesium sulfate and concentrated to give N,N'-bis(dichloroacetyl)perhydrocyclopenta[1,2-c:3,4-c']dipyrrole as a tan glass.

Similarly 7.45 g. of perhydrocyclopenta[1,2-c:3,4-c'] dipyrrole in the form of its bis(p-toluenesulfonate) salt was reacted with 4.53 ml. of chloroacetyl chloride to give 4.38 g. of N,N' - bis(chloroacetyl)perhydrocyclopenta-[1,2-c:3,4-c']dipyrrole [I; R is $ClCH_2CO$]; and 1.4 g. of perhydrocyclopenta[1,2-c:3,4-c']dipyrrole was reacted with 4.1 ml. of trichloroacetyl chloride to give N,N'-bis-(trichloroacetyl)perhydrocyclopenta[1,2 - c:3,4 - c']dipyrrole [I; R is $Cl_3CCO$], each obtained in the form of a tan glass.

By replacing the dichloroacetyl chloride in the foregoing example by a molar equivalent amount of acetyl chloride, propionyl chloride, butyryl chloride or caproyl chloride there can be obtained, respectively, N,N'-diacetylperhydrocyclopenta[1,2-c:3,4-c']dipyrrole [I; R is CH$_3$CO],
N,N'-dipropionylperhydrocyclopenta[1,2-c:3,4-c']dipyrrole [I; R is CH$_3$CH$_2$CO],
N,N'-dibutyrylperhydrocyclopenta[1,2-c:3,4-c']dipyrrole [I; R is CH$_3$CH$_2$CH$_2$CO], or
N,N'-dicaproylperhydrocyclopenta[1,2-c:3,4-c']dipyrrole [I; R is CH$_3$(CH$_2$)$_4$CO].

EXAMPLE 11

N,N'-bis(diethylaminoacetyl)perhydrocyclopenta-[1,2-c:3,4-c']dipyrrole [I; R is (C$_2$H$_5$)$_2$NCH$_2$CO]

N,N'-bis(chloroacetyl)perhydrocyclopenta[1,2-c:3,4-c'] dipyrrole (4.38 g.) was dissolved in 150 ml. of benzene with warming. Benzene (70 ml.) was distilled from the solution, the solution cooled to room temperature, and 11.8 ml. of diethylamine in 15 ml. of benzene was added over a 30 minute period. The reaction mixture was stirred 30 minutes at room temperature and at reflux 16 hours. The mixture was cooled, poured into ice-water, made strongly alkaline with sodium hydroxide solution and extracted with ether. The ether extracts were washed with water, dried over anhydrous magnesium sulfate and concentrated in vacuo. The residue, 4.16 g. was purified by repeated conversion to the amorphous dihydrochloride salt and reconversion to the free base to give N,N'-bis-(diethylaminoacetyl)perhydrocyclopenta[1,2 - c:3,4 - c'] dipyrrole as a tan glass.

By replacing the diethylamine in the foregoing preparation by a molar equivalent amount of pyrrolidine, piperidine, hexamethylenimine or morpholine, there can be obtained, respectively, N,N'-bis(1-pyrrolidinylacetyl)perhydrocyclopenta-[1,2-c:3,4-c']dipyrrole [I; R is C$_4$H$_8$NCH$_2$CO],
N,N'-bis(piperidinoacetyl)perhydrocyclopenta[1,2-c:3,4-c']dipyrrole [I; R is C$_5$H$_{10}$NCH$_2$CO],
N,N'-bis(hexamethyleniminoacetyl)perhydrocyclopenta-[1,2-c:3,4-c']dipyrrole [I; R is C H$_{12}$NCH$_2$CO], or
N,N'-bis(morpholinoacetyl)perhydrocyclopenta[1,2-c:3,4-c']dipyrrole [I; R is OC$_4$H$_8$CH$_2$CO].

I claim:
1. A compound of the formula

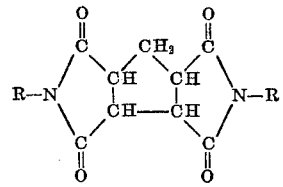

wherein R is di-lower-alkylamino-lower-alkyl, polymethylenimino-lower-alkyl or morpholino-lower-alkyl, wherein polymethyleneimino has from 5 to 7 ring members.

2. N,N'-bis(2-diethylaminoethyl)cyclopentane - 1,2,3,4-tetracarboximide, according to claim 1 wherein R is 2-diethylaminoethyl.

References Cited

UNITED STATES PATENTS 3,444,184  5/1969  Petropoulos et al. ___ 260—326.3

ALEX MAZEL, Primary Examiner

J. A. NARCAVAGE, Assistant Examiner